Figure 1:
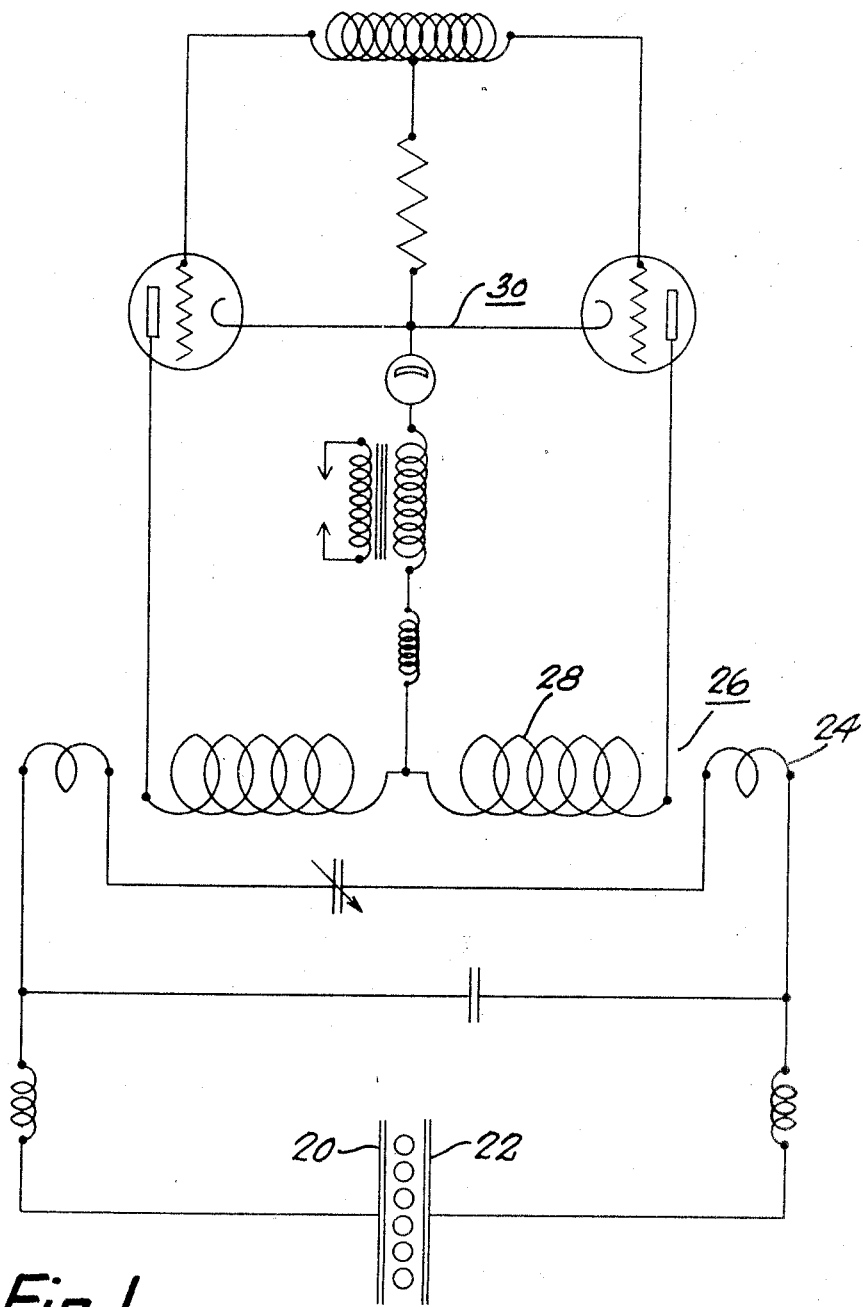

Aug. 15, 1944. R. E. MOULE 2,355,887
METHOD OF STERILIZATION
Filed March 5, 1943 2 Sheets-Sheet 2

INVENTOR
REX E. MOULE
BY
his ATTORNEYS

UNITED STATES PATENT OFFICE 2,355,887

METHOD OF STERILIZATION

Rex E. Moule, Dayton, Ohio, assignor to General Motors Corporation, Detroit, Mich., a corporation of Delaware Application March 5, 1943, Serial No. 478,111

4 Claims. (Cl. 21—102)

This invention relates to a method of sterilization and apparatus for carrying out such a method.

An object of the invention is to provide a method and apparatus for sterilizing the contents of plastic ampules. In such an apparatus and method it is desirable to heat the contents of the ampule to a temperature suitable for sterilization of the same while maintaining the ampule at a temperature sufficiently low to prevent softening or disintegration thereof.

A further object of the invention is to provide a method and apparatus for electrically sterilizing the contents of a plastic ampule while maintaining the ampule at a relatively low temperature.

In carrying out the above object, it is a further object to provide a method and apparatus whereby high frequency currents are utilized to produce heat in the order of 270° F. for killing spores in parental solutions contained in plastic ampules which normally soften at a temperature of above 200° F. and wherein the plastic ampule is pamaintained at a temperature substantially lower than 200° F.

Further objects and advantages of the present invention will be apparent from the following description, reference being had to the accompanying drawings wherein a preferred embodiment of one form of the invention is clearly shown.

Figure 2:
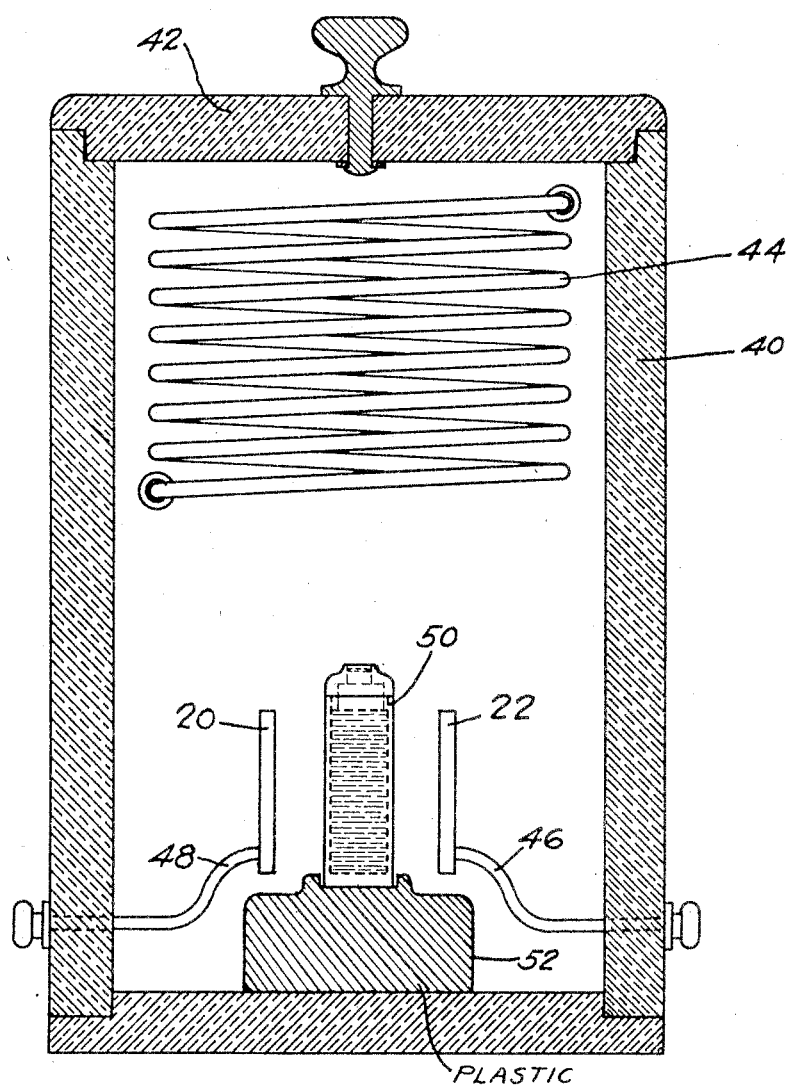

In the drawings:

Fig. 1 shows a wiring diagram of one type of apparatus which may be used in carrying out the invention contained herein, and Fig. 2 is a diagrammatic view of the apparatus utilized.

In Patent No. 2,290,348, I describe and claim a plastic ampule preferably made of polystyrene which may be filled with a parental solution that in many cases must necessarily be sterilized after placement within the ampule. This operation involves several problems which are solved by the present invention namely, when such solutions are sterilized to eliminate living organisms therein, it is necessary to heat the solution in the neighborhood of 270° F. and maintain said temperature for a period of time necessary to destroy the living organisms in the solution. During this heating period, it has been found that a pressure is developed in the ampule. Since the plastic from which the ampule is made begins to soften appreciable at 200° F., it is apparent that the ampule will distort in shape and under some conditions explode. In order to overcome these difficulties, I have found that it is necessary to maintain the ampule at a substantially lower temperature to prevent distortion as occasioned by softening while heating the solution therein to the sterilization temperature. In order to accomplish this, I place or convey the ampules into a container or box (not shown) which is preferably insulated and which is maintained at a temperature of 50° below zero or at any other temperature sufficiently low to prevent the specific plastic in the ampule from softening. The ampules within the refrigerated container are placed between a pair of electrodes or plates which are shown at 20 and 22 in the drawings. The plates are in turn connected across the secondary 24 of a transformer 26, which transformer 26 has a primary 28 thereof connected as shown in the diagram to a tube circuit 30 capable of inducing high frequency currents across said plates 20 and 22. Preferably, the frequency of the current passing between said plates is maintained in the order of 50 megacycles. I have found that the di-electric resistance of the parental solution within the ampules produces heat when in the high frequency current whereby the contents of the ampule is heated to the desired temperature in the neighborhood of 270° F. while the refrigerated container maintains the plastic ampule at a temperature below the softening point. In this manner it is possible to sterilize solutions within the ampules without distortion or destruction of the container. After the sterilization has been carried out for a desired time which varies in accordance with the organisms to be destroyed and the solutions etc., the current is turned off and the ampules are removed from between the plates. It was found that when heating polystyrene ampules, that no discoloration or any deleterious results were noted in the ampule. In some cases, a temperature of 212° F. is suitable for sterilizing parental solutions, which solutions are generally electrolytic in character, due to the inclusion of salt thereby making them particularly adaptable for use in the present method. I have found that maintaining a temperature above 212° F. for thirty minutes in most cases sterilizes the solutions. This temperature may be reached in 15 seconds when heating with a 50 megacycle current and wherein the atmosphere surrounding the ampule is maintained at 40° below zero.

One type of apparatus for carrying out the process intermittently is shown in Fig. 2 wherein an insulated box 40, having a removable cover 42 is utilized. Inside the box are refrigerating coils 44 and a pair of electrodes 20 and 22 which are connected by wires 46 and 48 to a suitable current source as shown in Fig. 1. One or more ampules 50 are placed between the electrodes and are held by means of a holder 52 which is preferably plastic. Thus when the high frequency current is impressed on the electrodes, the solution within the ampule is heated as heretofore noted. Obviously, other apparatus for obtaining similar results may be used and in place of refrigerating coils, solid $CO_2$ liquid air or the like may be used to cool the box in accordance with the temperature desired.

The circuit for producing high frequency currents and the phenomena of heating through the use of high frequency currents are well-known and is not believed that further description is necessary.

From the foregoing it will be seen that I have produced a method and apparatus for sterilizing the contents of ampules at substantially high temperatures while maintaining the ampule at substantially low temperatures for preventing distortion thereof.

It is apparent that instead of intermittent operations the ampules may be carried continuously between the plates by means of a conveyor passing between the plates and through the refrigerated area. Such modification coming fully within the scope of my invention.

While the embodiment of the present invention as hereindisclosed, constitutes a preferred form, it is to be understood that other forms might be adopted, all coming within the scope of the claims which follow.

What is claimed is as follows:

1. In the method of sterilizing the contents of plastic ampules the steps comprising; subjecting the contents of a plastic ampule to a high frequency electric current sufficient to cause the contents of said ampule to be heated to a sterilization temperature, and simultaneously maintaining an atmosphere ambient to said ampule at a temperature sufficiently low to prevent the ampule from softening by conduction of heat from the contents thereof.

2. In the method of sterilizing solutions contained within plastic ampules the steps comprising; placing an ampule between a pair of plates which are connected to a high frequency source, passing high frequency current between said plates and through said ampule for causing the solution within the ampule to become heated to a sterilization temperature and simultaneously cooling the ampule by means of low ambient temperature maintained in the surrounding atmosphere.

3. An apparatus for sterilizing solutions contained in plastic ampules comprising in combination; a pair of electrode plates, a high frequency circuit connected to said plates for causing high frequency currents to pass therebetween, a holder for a plastic ampule disposed between said plates, and a container for the plates and holder adapted to be refrigerated.

4. In a method of sterilizing the contents of a plastic ampule wherein said contents consists of a solution of an electrolytic character, the steps of, heating the contents only of the ampule by means of induced high frequency currents therein to a temperature and for a time sufficient to sterilize the contents of said ampule, and simultaneously cooling the ampule per se by means of an ambient atmosphere of a temperature sufficiently low to prevent the ampule from softening by conduction of heat.

REX E. MOULE.